United States Patent
Heer

(10) Patent No.: US 10,404,416 B2
(45) Date of Patent: Sep. 3, 2019

(54) REDUNDANT TRANSMISSION SYSTEM WITH PRP AND FAULT PREDICTION

(71) Applicant: Hirschmann Automation and Control GmbH, Neckartenzlingen (DE)

(72) Inventor: Tobias Heer, Frickenhausen (DE)

(73) Assignee: HIRSCHMANN AUTOMATION AND CONTROL GMBH, Neckartenzlingen (DE)

( * ) Notice: Subject to any disclaimer, the term of this patent is extended or adjusted under 35 U.S.C. 154(b) by 183 days.

(21) Appl. No.: 15/302,208

(22) PCT Filed: Apr. 9, 2015

(86) PCT No.: PCT/EP2015/057786
§ 371 (c)(1),
(2) Date: Oct. 21, 2016

(87) PCT Pub. No.: WO2015/155315
PCT Pub. Date: Oct. 15, 2015

(65) Prior Publication Data
US 2018/0351702 A1    Dec. 6, 2018

(30) Foreign Application Priority Data
Apr. 9, 2014 (DE) ................ 10 2014 206 873

(51) Int. Cl.
| | | |
|---|---|---|
| *H04L 1/08* | (2006.01) | |
| *H04L 1/00* | (2006.01) | |
| *H04L 1/22* | (2006.01) | |
| *H04L 12/703* | (2013.01) | |

(52) U.S. Cl.
CPC ............... *H04L 1/08* (2013.01); *H04L 1/004* (2013.01); *H04L 1/0041* (2013.01); *H04L 1/22* (2013.01); *H04L 45/28* (2013.01); *H04L 2001/0096* (2013.01)

(58) Field of Classification Search
CPC ........ H01H 31/02; H04L 1/22; H04L 63/0227
USPC ..................... 370/329; 324/555; 709/238
See application file for complete search history.

(56) References Cited

U.S. PATENT DOCUMENTS

| | | | |
|---|---|---|---|
| 8,344,736 B2 * | 1/2013 | Wimmer | H04L 1/22 324/555 |
| 8,862,944 B2 | 10/2014 | Dodson | |
| 2004/0199662 A1 * | 10/2004 | Karol | H04L 63/0227 709/238 |

* cited by examiner

*Primary Examiner* — Jung H Park
(74) *Attorney, Agent, or Firm* — Andrew Wilford

(57) ABSTRACT

A method of operating a transmission system (1) having a first network (2) and at least one second network (3), data being exchanged between these at least two networks (2, 3) in that data of the first network (2) is fed to duplication means (4), the inputted data being transmitted wirelessly to separator means (5) via at least two transmission paths (6, 7) using PRP and forwarded from the separator means (5) to the connected second network (3), characterized in that the data is transmitted in the form of data packets, and it is ascertained whether or not a data packet was transmitted, and it is determined based thereon whether or not the transmission system (1) is operating in a fault-free manner.

4 Claims, 1 Drawing Sheet

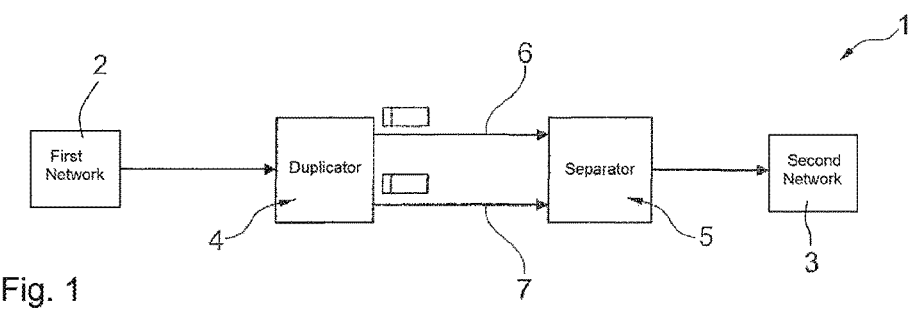
Fig. 1
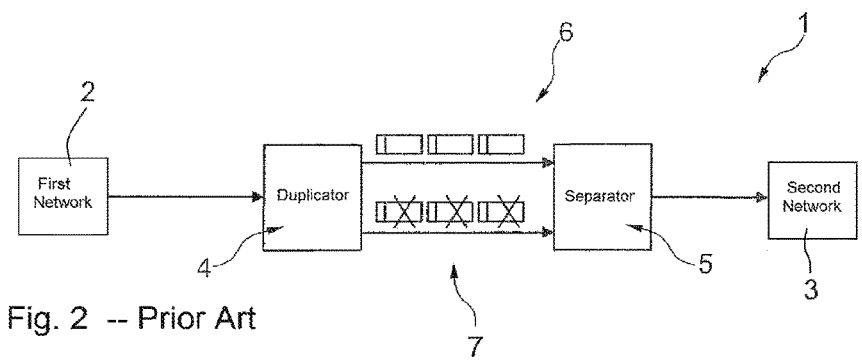
Fig. 2 -- Prior Art

REDUNDANT TRANSMISSION SYSTEM WITH PRP AND FAULT PREDICTION

CROSS REFERENCE TO RELATED APPLICATIONS

This application is the U.S.-national stage of PCT application PCT/EP2015/057786 filed 9 Apr. 2015 and claiming the priority of German patent application 102014206873.8 itself filed 9 Apr. 2014.

FIELD OF THE INVENTION

The invention relates to a method of operating a transmission system having a first network and at least one second network where data is exchanged between these at least two networks in that data of the first network is fed to duplication means and thence transmitted wirelessly to separator means via at least two transmission paths using PRP and forwarded from the separator means to the connected second network.

BACKGROUND OF THE INVENTION

Such known transmission systems are used in safety-critical cases in process engineering plants, or stationary or mobile work devices, for example work vehicles such as cranes or the like.

It is important that the data be transmitted reliably from the first network to the at least one second network. Such safety-critical data transmission is especially important when the data is transmitted via a wireless transmission path. For this purpose, there has already been one improvement such that not only one transmission path, but at least two, and preferably exactly two, transmission paths are used for this safety application. An additional improvement of this redundant data transmission has taken place in that this is used wirelessly, which is to say via radio or light, using the Parallel Redundancy Protocol (PRP) that is a layer-2 redundancy method that is independent of higher layers and is above all suitable for real-time Ethernet mechanisms.

From safety aspects, such a transmission system already operates satisfactorily since redundancy of the two transmission paths is provided. For example, when a disturbance or failure of one wireless transmission path occurs, the at least one second transmission path can be used to ensure the transmission of data from the first to the second network.

However, it cannot be precluded, despite this redundancy, that data transmission between the two networks is impermissibly disturbed under safety-critical aspects.

While the redundancy is considerably increased and safety-critical aspects were taken into account in such transmission systems having at least two transmission paths, there is still a risk that such a transmission system does not operate absolutely free from faults. Due to the redundancy mechanism that is implemented by the wireless data transmission using PRP via two transmission paths that are independent of one another, there is a risk, due to the error compensation using PRP, that a seemingly fault-free transmission system is present, while in fact this is not the case since the redundancy mechanism is able to detect and compensate for internal system faults. For example, it is not possible for the operator of the transmission system to identify individual data packets that were lost on the transmission path. Due to the redundancy mechanism, the impression may thus be created that the transmission system is operating without fault; this, however, is not the case since the transmission system can independently compensate for errors. For example, in the event that one of the at least two transmission paths is permanently disturbed or has completely failed, data transmission can still take place via the other available transmission path, resulting in a transmission system that operates in a seemingly fault-free manner. However, a risk then exists that the only transmission path still available can no longer ensure reliable data transmission in the event of a disturbance or a failure, and consequently safety-critical situations may arise that in fact should absolutely be avoided due to the redundancy. In such a case, the redundancy mechanism would be permanently active, and the data would only be transmitted via the only transmission path still available, while the at least additional transmission path is no longer available, which, however, is not, or not readily, apparent to a user of the transmission system. From this follows that no redundancy reserve is available any more, since the actual redundancy mechanism, which is to say the separate transmission of data from the one network to the other, is permanently disturbed.

Such a case is illustrated in FIG. 2. From this, it is apparent that data is transmitted permanently and without fault via the one transmission path, while the same data being transmitted via the further transmission path is lost 100%, for example because this transmission path has completely failed. The data that was transmitted 100% fault-free via the one transmission path then arrives at the second network fault-free, so that data transmission can be maintained, and the fault-free operation of the transmission system is ensured. However, if a disturbance of the transmission path occurs that was used to previously transmit 100% of the data, the redundancy mechanism is impaired, or in the worst-case scenario even completely suspended, and the disadvantage of critical situations may occur.

OBJECT OF THE INVENTION

It is therefore the object of the invention to improve a method of operating a transmission system with respect to safety reserves thereof.

SUMMARY OF THE INVENTION

This object is achieved by the features of claim 1.

According to the invention, the data is transmitted in the form of data packets and a determination is made whether or not a data packet was transmitted, and that based on this determination, another determination is made whether or not the transmission system is operating in a fault-free manner. The solution of the invention thus makes it possible to establish whether or not the redundancy mechanism is operating, and based thereon information may be determined as to whether the transmission system is operating in a fault-free or faulty manner, which is to say using the redundancy mechanism. In this way, the option of monitoring the transmission system, and possibly initiating countermeasures, is created for the user. If it is established, for example, that all data packets were transmitted in a fault-free manner both via the one and the additional transmission path, it is possible to establish whether the entire transmission system is operating in a fault-free manner, and the necessary and desired redundancy reserve is available without restrictions. However, if it is established that some of the data was not transmitted in a fault-free manner via the one transmission path and/or some of the data was not transmitted in a fault-free manner via the other transmission path (for example, because a disturbance existed in one of the transmission paths or a fault is present in components of the transmission system), one can determine that, while the transmission system is still able to transmit data from the one network to the other, the redundancy reserve is only partly functional. Depending on the extent of the data packets that were transmitted in a faulty manner or not transmitted at all, it is possible to determine whether this error level is still permissible and has not yet dropped below the required redundancy reserve, or whether this is already the case, making it necessary to initiate at least a fault analysis or optionally counter-measures.

In a refinement of the invention, every data packet transmitted in a fault-free manner is counted and related to the total number of transmitted data packets, and based thereon a failure likelihood is calculated. The duplication means (redundancy box) thus knows how large the number of the data packets is that are sent on a transmission path. This number can be sent to the separator means (redundancy box) that can then count the data packets that are transmitted in a fault-free manner on this transmission path and received by it. These two numbers are compared and, in the case of the fault-free transmission the ratio is equal to 1. However, if it is smaller than 1, it is to be assumed that data packets were lost during the transmission on the transmission path, due to disturbances, failures or the like. A decision can then be made by what degree the ratio is smaller than 1. If it is between 0.9 and 1, for example, or between 0.8 and 1, it may be assumed that data transmission is still working, but that the redundancy mechanism has been deployed. In this case, however, no drop below the redundancy reserve (that has a ratio of 0.9 or 0.8, for example) has taken place yet, so that an intervention of a user of the transmission system is not yet required. An intervention of the user with respect to a fault analysis or a fault elimination is only needed when a further drop below this redundancy reserve of 0.9 or 0.8, for example, takes place, even though data transmission between the first network and the second network is still taking place reliably. In such a case, a failure of the transmission system or an impairment can be counteracted, despite continued correct data transmission. This is particularly advantageous under safety-critical aspects, since according to the invention it is possible to identify faults in an anticipatory manner and take appropriate action.

In a refinement of the invention, the above-described procedure takes place separately for each transmission path. This means that every data packet that was transmitted in a fault-free manner is counted for every transmission path, and is related to the total number of transmitted data packets, and based thereon a failure likelihood or the above-described redundancy reserve is calculated. In a particularly advantageous manner, this failure likelihood or the redundancy reserve is displayed. For this purpose, appropriate means are provided. These means can be a kind of traffic light, for example that signals whether the transmission system is operating 100% fault-free, including all units of the transmission system, without the redundancy mechanism having deployed. Using appropriate lamps, this state could be displayed in a green color, for example. However, if a certain failure likelihood is calculated, so that the redundancy reserve is no longer equal to 1, but smaller than 1, this can be displaced by lamps in a yellow color, for example. This is carried out as long as the redundancy reserve is smaller than 1, but above a predetermined threshold that is smaller than 1 and greater than 0. This threshold may be the predefined value 0.9 or 0.8, for example, or values deviating therefrom. In any case, this color signals to the operator of the transmission system that the redundancy mechanism has deployed and that, while data transmission is still fault-free, it is taking place in a manner that is restricted with respect to the redundancy. The operator can determine based thereon whether to conduct a fault analysis and eliminate the established faults as a function thereof. Faults that are established may be, for example, disturbances of the transmission path or else hardware failures of components of the transmission system. Only when the failure likelihood exceeds a predetermined threshold, which is equivalent to the redundancy reserve dropping below a threshold smaller than 1, does a considerable restriction exist not only in data transmission, but also in the redundancy, so that safety-critical states can result if this state is maintained. In such a case that may be signaled by red lamps, it is thus necessary to act so as to absolutely avoid such safety-critical states. In addition to the display that a certain failure likelihood is present, it is also possible as an alternative or in addition to consider that a notification is triggered when the failure likelihood exceeds a predetermined threshold or the redundancy reserve drops below a predetermined value of smaller than 1. For example, this may be a text message or comparable message, an e-mail, or the like that a network administrator receives, for example.

BRIEF DESCRIPTION OF THE DRAWING

The above-described method can be carried out on a transmission system that is shown in the drawing in which:

FIG. 1 is a schematic view of the invention; and

FIG. 2 is a schematic view of the prior art.

SPECIFIC DESCRIPTION OF THE INVENTION

FIG. 1 shows a basic arrangement of a transmission system comprising two networks 2 and 3 that exchange data between one another. This data exchange may take place either unidirectionally from the network 2 to the network 3 (or vice versa), or also bidirectionally between the two networks 2 and 3.

The networks 2 and 3 may be simple or complex networks, for example having a ring or line topology or the like. However, it is also conceivable that each network 2, 3 comprises only a single element, such as a sensor, an actuator, a control device or the like.

A duplicator 4 are present to transmit the data of the network 2 for example to the network 3. This duplicator 4 divides the inputted data stream into two data substreams. In addition, the two data substreams are combined after being received by the separator 5, and then the received data streams are outputted to the network 3 after having been combined.

The transmission of the data between the duplication means and the separator 5 takes place wirelessly via two transmission paths 6, 7 that are identical or different from one another, using PRP. Wireless transmission advantageously takes place by radio, but an optical transmission is also conceivable. It is also conceivable that the one transmission path 6 is a radio transmission path, and the second transmission path 7 is an optical data transmission path. If both transmission paths 6 and 7 are radio transmission paths, for example, the data, or more precisely the data packets, can be transmitted via these two radio transmission paths at the same frequency or at different frequencies, for example, and otherwise identical parameters, or transmission parameters that differ from one another. Identical transmission paths 6 and 7 are to be preferred with respect to the structures thereof, and transmission paths 6, 7 that differ from each other (such as optical/radio or transmission parameters that differ from one another) are to be preferred with respect to the increase in redundancy.

After the data has been fed from the first network 2 to the duplicator 4 (in the case of PRP, also referred to as redundancy box), a prompt occurs there to transmit each data packet several times via the same transmission path 6, 7 and/or assign an error correction value to every data packet. Thereafter, the data packets are appropriately transmitted via the transmission paths 6, 7, wherein the data is appropriately evaluated, if necessary prepared, by the separator 5 (in the case of PRP, also referred to as redundancy box), and fed to the second network 3 as data packets.

The above description of FIG. 1 refers to a unidirectional data transmission from the first network 2 to the additional, in particular the second, network 3. For this purpose, the duplicator 4 is designed to divide the data stream, and the separator 5 is designed to combine the received data substreams.

If data transmission from the network 3 to the network 2 is also desired, additional duplicator 4 and separator 5 may be present in the transmission route between the network 3 and the network 2, resulting in a double structure. As an alternative, the means 4, 5 may also be designed to not only double the inputted data stream, but also to separate the data streams fed via the transmission paths 6, 7, which also applies to the separator.

The invention claimed is:

1. A method of exchanging data between a first network and a second network, the method comprising the steps of:

feeding the data of the first network to duplication means;

transmitting the data as packets from the duplication means wirelessly to separator means via at least two transmission paths using PRP Parity Redundancy Protocol;

forwarding the data from the separator means to the connected second network;

first determining whether or not a data packet was transmitted by counting every data packet transmitted without faults and comparing a count of fault-free transmitted data packets to a total number of transmitted data packets; and thereafter, based on the first determination, determining whether or not the transmission system is operating in a fault-free manner by calculating based on the count determined by the comparison a failure likelihood.

2. The method according to claim 1, wherein every data packet transmitted in a fault-free manner is counted for every transmission path and related to the total number of transmitted data packets, and based thereon the failure likelihood is calculated.

3. The method according to claim 1, further comprising the step of:

displaying the failure likelihood.

4. The method according to claim 1, further comprising the step of:

triggering a notification when the failure likelihood exceeds a predetermined threshold.

* * * * *